United States Patent [19]

Todd et al.

[11] Patent Number: 4,948,510
[45] Date of Patent: Aug. 14, 1990

[54] BIOLOGICAL PHOSPHOROUS REMOVAL FROM WASTEWATER USING MULTIPLE RECOMBINABLE BASINS

[75] Inventors: Michael D. Todd; Raleigh L. Cox, both of Baton Rouge, La.

[73] Assignee: United Industries, Inc., Baton Rouge, La.

[21] Appl. No.: 420,562

[22] Filed: Oct. 12, 1989

[51] Int. Cl.$^5$ ............................................. C02F 3/30
[52] U.S. Cl. .................................. 210/605; 210/622; 210/624; 210/630; 210/903; 210/906
[58] Field of Search ........ 210/605, 607, 614, 621–626, 210/629, 630, 906, 903

[56] References Cited

U.S. PATENT DOCUMENTS

| | | | |
|---|---|---|---|
| Re. 32,429 | 6/1987 | Spector | 210/605 |
| 3,390,077 | 6/1968 | Forrest | 210/906 X |
| 3,468,795 | 9/1969 | Bye-Jorgensen et al. | 210/7 |
| 3,964,998 | 6/1976 | Barnard | 210/906 X |
| 4,029,575 | 6/1977 | Bykowski et al. | 210/906 X |
| 4,162,153 | 7/1979 | Spector | 210/903 X |
| 4,353,800 | 10/1982 | Besik | 210/605 |
| 4,431,543 | 2/1984 | Matsuo et al. | 210/605 |
| 4,488,967 | 12/1984 | Block et al. | 210/605 |
| 4,488,968 | 12/1984 | Hong et al. | 210/605 |
| 4,522,722 | 6/1985 | Nicholas | 210/605 |
| 4,650,585 | 3/1987 | Hong et al. | 210/605 |
| 4,655,925 | 4/1987 | Tabata et al. | 210/605 |
| 4,867,883 | 9/1989 | Daigger et al. | 210/605 |

Primary Examiner—Tom Wyse
Attorney, Agent, or Firm—William David Kiesel; Robert C. Tucker; Timothy J. Monahan

[57] ABSTRACT

A process for treating wastewater to biologically remove phosphorous as well as lowering ammonia, TSS and BOD levels is provided. The process employs a plurality of basins which may be individually controlled to achieve anaerobic, anoxic or aerobic conditions. The basins are reconfigurable in that the flow of influent to a basin, transfer of mixed liquor between basins and effluent discharge from a basin can be varied to create a treatment cycle which has features of both continuous and batch processes while minimizing recycle rates and hydraulic level changes.

16 Claims, 3 Drawing Sheets

BIOLOGICAL PHOSPHOROUS REMOVAL FROM WASTEWATER USING MULTIPLE RECOMBINABLE BASINS

FIELD OF THE INVENTION

1. Background of the Invention

This invention relates generally to processes for the removal of phosphorous from wastewater by treatment with phosphorous storing microorganisms. More particularly, this invention relates to a process having a treatment cycle during which multiple basins are recombined to optimize growth of phosphorous storing microorganisms, uptake of phosphorous by the organisms and nitrification of ammonia, to produce an effluent stream low in phosphorous and ammonia. Additionally, the process significantly lowers the biochemical oxygen demand and total suspended solids present in the wastewater influent.

2. Prior Art

One prior art method of removing phosphorous from wastewater is to precipitate the phosphorous by addition of chemicals. Chemical precipitation using lime, aluminum sulfate (alum) and ferric chloride has been effective, but unfortunately, produces a sludge which in turn requires special handling and disposal. In addition to serving as a primary method for phosphorous removal, chemical precipitation may also be used to treat an activated sludge generated by a biological phosphorous removal system or in a polishing step prior to discharge of the effluent. While recognizing that chemical precipitation may be used in combination with biological phosphorous removal, the invention herein focuses on the use of phosphorous storing microorganisms as a treatment to reduce phosphorous in wastewater.

A background description of the biological removal of phosphorous from wastewater is found in "Design Manual, Phosphorous Removal" EPA/625/1-87/001, September, 1987, published by the U.S. Environmental Protection Agency, Cincinnati, Ohio. Additional descriptions may be found in the "Principles and Practice of Nutrient Removal from Municipal Wastewater" published by The Soap and Detergent Association, New York, N.Y., October, 1988.

The mechanism of biological phosphorous removal involves mixing influent wastewater containing organic compounds measured as the biochemical oxygen demand (BOD) with activated sludge containing phosphorous storing microorganisms. The organic compounds are present in both soluble and particulate form and are fermented by facultative bacteria into acetate and other fermentation products. Under anaerobic conditions, phosphorous storing microorganisms can readily assimilate the fermentation products giving them a competitive advantage over other normally occurring microorganisms in activated sludge systems. This assimilation of fermentation products by phosphorous storing microorganisms is facilitated by energy made available from the hydrolysis of stored polyphosphates. Thus, during the initial phase of treatment during which phosphorous storing microorganisms are selectively grown under anaerobic conditions, phosphorous is released in the liquor.

The second step of biological phosphorous removal is to expose the aforementioned liquor containing phosphorous storing microorganisms and soluble phosphorous, to aerobic conditions. During the aerobic phase, the substrates are utilized by the phosphorous storing microorganisms resulting in a population increase and uptake of soluble phosphorous which may be stored as polyphosphate. Thus, the degree to which the phosphorous storing microorganisms can preferentially assimilate acetate and fermentation products in the anaerobic phase, directly influences the amount of phosphorous which may be taken up in the aerobic phase.

After the soluble phosphorous which was present in the liquor, has been stored by the phosphorous storing microorganisms, the mixed liquor is clarified to produce an effluent and an activated sludge. Most of the activated sludge is recycled back into the system.

Treatment of wastewater to remove phosphorous may also include steps which are introduced to maximize the nitrification of $NH_3$ and reduce of nitrate nitrogen to nitrogen gas. The initial nitrification step is accomplished by subjecting the ammonium nitrogen entering the system to aerobic conditions to produce nitrites, and in turn, nitrates. Next, by decreasing the dissolved oxygen (DO) in the mixed liquor, the oxygen available for microorganisms can be limited to that oxygen associated with nitrate nitrogen. This step is referred to as the anoxic stage. During the anoxic stage, nitrate nitrogen is reduced to nitrogen gas by the microbial actions of assimilation of influent BOD and respiration.

As water quality standards are raised worldwide, many treatment plants are being required to limit both the level of phosphorous and ammonia in their effluent. In some instances, a limit on total nitrogen in the effluent, including ammonia, is imposed. The prior art processes discussed below are examples of industry's efforts to meet those requirements.

One type of treatment plant for biological phosphorous removal comprises a combination of anaerobic, anoxic and aerobic tanks followed by a clarifier. The flow of mixed liquor through the tanks is continuous and one or more recycle streams is provided. An example of a continuous treatment process designed to meet effluent phosphorous and total nitrogen limits is the Modified UCT process developed at the University of Capetown in South Africa.

The modified UCT process comprises a series of four tanks which are maintained under anaerobic, anoxic, and aerobic conditions respectively. There is a first recycle stream from the first anoxic tank to the anaerobic tank and a second recycle stream from the aerobic tank to the second anoxic tank. From the last tank, the aerobic tank, the mixed liquor flows to a clarifier. Recycled sludge is returned to the first anoxic tank.

The modified UCT process is designed to contact BOD rich influent with phosphorous storing microorganisms under anaerobic conditions. Recycled sludge from the clarifier contains oxygen associated with nitrate which may act as an oxygen source allowing undesirable microorganisms to compete for food in the influent. To reduce the nitrate nitrogen in the anaerobic tank, recycled sludge is introduced into the first anoxic tank and is in turn recycled into the anaerobic tank after having been partially denitrified.

The second recycle stream, from the aerobic tank to the second anoxic tank, is designed to expose nitrates produced in the aerobic tank to anoxic conditions for denitrification prior to discharge. One of the drawbacks of the continuous processes employing recycle streams is the large volume of mixed liquor which is recycled, often between 100 and 300% of the flow rate through the process.

Another example of a prior art biological treatment process is known as a Sequenching Batch Reactor (SBR). A single tank containing an activated sludge is filled with an influent and maintained first under anaerobic conditions followed by aeration. The contents of the tank are next allowed to settle and the clarified liquor is withdrawn leaving behind a portion of the activated sludge which is used in the next sequence. The SBR system requires a complex arrangement of level sensors, automatic timers, valves and controllers. Additionally, several reactors and ancillary control equipment are required to meet the needs of a plant receiving a continuous flow of influent.

SUMMARY OF THE INVENTION

Therefore, one object of the invention is to provide a wastewater treatment plant featuring biological phosphorous removal and reduction of ammonia and total nitrogen in the plant effluent as well as traditional removal of TSS and BOD.

Another object of the invention is to provide a treatment plant having features of a continuous process while minimizing recycle of mixed liquor between tanks.

Another object of the invention is to provide a treatment plant having individual tanks which convert from anaerobic/ aerobic/anoxic states while minimizing hydraulic level changes within the tanks.

Another object of the invention is to provide a process which can be installed by retrofitting existing plants having oxidation ditches.

PREFERRED EMBODIMENT OF THE INVENTION

Without limiting the scope of the invention, the preferred embodiments of the invention are hereinafter set forth.

Figure 7:
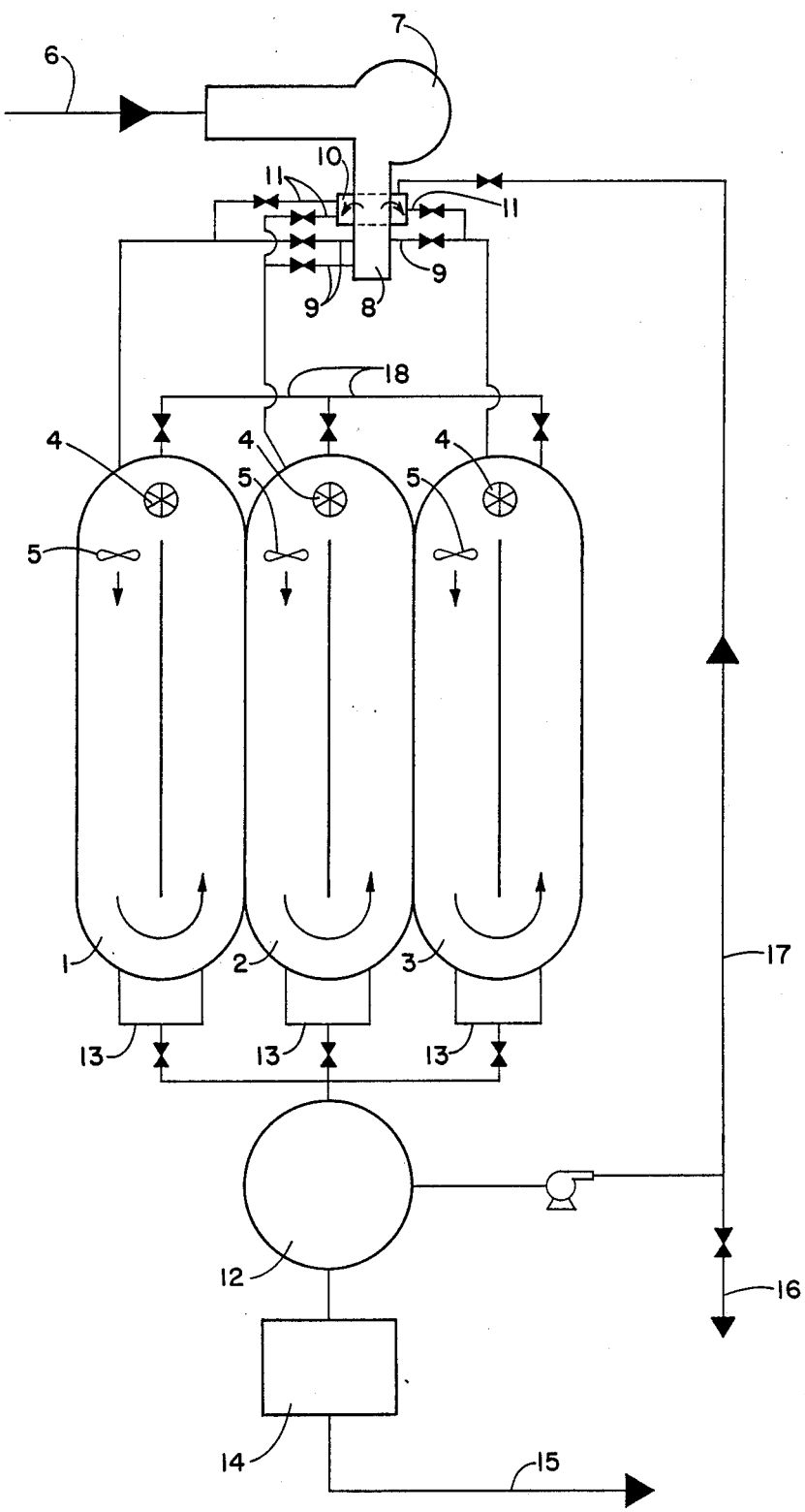
FIG. 7 is a plan view of the multiple basin system and flow splitter.

Referring to FIG. 7, basin 1, basin 2 and basin 3, referred to collectively as the basins, are shown, each having an aerator 4 and a mixer 5. The term basins is intended to include a single basin which has been effectively partitioned into a plurality of basins, such as by employing common wall construction or otherwise. The wastewater stream to be treated, influent 6, enters headworks 7 where it is distributed by flow splitter 8 via influent distribution pipes 9 to the basins. A second distribution network, return sludge splitter 10, distributes recycled activated sludge to the basins via recycled sludge distribution pipes 11. Any influent overflow occurring at peak times is directed to return sludge splitter 10 and to the basins along with the recycled activated sludge.

Mixed liquor is transported from the basins to clarifier 12 via a network of discharge lines 13. From clarifier 12, the supernatant is transported to filter 14 where it leaves the system as effluent stream 15. A portion of the activated sludge from clarifier 12 may be directed to secondary treatment or disposal via waste sludge line 16 while the remainder of the activated sludge is returned to sludge splitter 10 via sludge return line 17.

Mixed liquor is transported between the basins via interbasin lines 18. The use of control valves to regulate the flow of mixed liquor between basins as well as to regulate the flow splitters and distribution lines is known to those with skill in the art.

Organic loading rates of up to 50 lbs. of BOD per day per 1000 ft.$^3$ of total basin volume may be feasible at some locations. In a preferred embodiment, basins 1, 2 and 3 each have an equal volume and combined will have an organic loading rate of 15 lbs. or less of BOD per day per 1000 ft.$^3$ of total basin volume. For example, in a one million gallon per day plant, the total volume of all three basins will be one million gallons assuming an influent BOD of approximately 240 mg/l and TSS of 240 mg/l. An estimated 97% of the solids recovered from clarifier 12 are recycled to the basins. It is believed that the aforementioned recycle rate will achieve a sludge age of 20–30 days. The hydraulic level of each basin remains substantially constant during operation. If a basin is receiving influent, mixed liquor is being transferred to another basin at about the same rate. Similarly, if a basin is receiving a transfer of mixed liquor, it will discharge to the clarifier at about the same rate less the rate of recycled sludge returned to the system. In the following example, recycled sludge is returned to the basin which is discharging to the clarifier. Alternatively, recycled sludge could be returned to one of the other basins. Preferably, recycled sludge is not returned to the basin receiving influent for the reason that the sludge contains dissolved oxygen and nitrate associated oxygen which may disturb anaerobic conditions in the basin.

The calculations herein are based upon an influent wastewater stream having 240mg/liter total suspended solids (TSS); 240mg/liter biochemical oxygen demand (BOD); 30mg/liter of nitrogen; and 10 mg/liter phosphorous. The influent also contains fatty acids, fermentation products, carbohydrates and other carbon sources, as well as particulate.

The basins typically operate with a mixed liquor suspended solids (MLSS) concentration of between 2,000 to 5,000 ppm. The MLSS can be varied by increasing or decreasing the amount of recycled sludge and the amount of waste sludge.

It is believed that based upon the aforementioned influent characteristics, reductions of phosphorous of greater than 90% may be achieved. Further, one may expect a 97% reduction in ammonia and 50% reduction in total nitrogen. Of course, actual performance of the system will be site specific and based upon the actual flow rate versus the design flow rate. The process is expected to work optimally at between 60-100% of design flow rate.

Briefly, the treatment system allows one to vary the particular basin which will receive influent, receive recycled activated sludge, discharge to the clarifier and receive interbasin transfer of mixed liquor. The aerator in each basin may be individually controlled. Thus, by recombining the basins and varying flows and aeration, removal of phosphorous and conversion of ammonia can be maximized while minimizing internal recycle of the mixed liquor. Mixer 5 in each basin will usually be left on at all times but may be turned off during the aeration step depending on the type of aerator used.

The mechanisms of biological phosphorous removal are discussed in "Design Manual, Phosphorous Removal" EPA/625/1-87,001 September, 1987, published by the Environmental Protection Agency, Cincinnati, Ohio and incorporated herein by reference. The bacteria generally associated with biological phosphorous removal belong to the Acinetobacter genus. As discussed above, under anaerobic conditions, these bacteria compete effectively for substrate utilization. Later, the Acinetobacter species can be subjected to aerobic conditions during which time they will store soluble phosphorous. Other bacteria associated with phosphorous removal, denitrification or anaerobic fermentation are Aeromonas and Pseudomonas. Bacteria capable of competitive substrate utilization and phosphorous removal under anaerobic and aerobic conditions respectively, such as Acinetobacter, are referred to herein as phosphorous storing microorganisms.

The term anaerobic is used to describe conditions of low concentrations of dissolved oxygen and nitrate associated oxygen, both preferably at concentrations near zero. At a minimum, anaerobic conditions sufficient to provide for a population selection of phosphorous storing microorganisms and their utilization of substrates contained in the wastewater influent are required. A dissolved oxygen (DO) content of less than 0.7 mg/l has been found to be effective during the anaerobic phase.

The basins are converted from aerobic to anaerobic conditions by discontinuing aeration and allowing the dissolved oxygen to effervesce and be utilized by bacteria. As the dissolved oxygen levels decrease, bacteria utilize nitrate associated oxygen as an oxygen source, converting nitrates to $N_2$ gas. While effective population selection of phosphorous storing microorganisms under anaerobic conditions is possible with significant nitrates present (anoxic), preferably a period is allowed for denitrification to occur before influent is added to a basin.

Phosphorous is removed later in the process by aerating the mixed liquor in a basin sufficiently to induce the phosphorous storing microorganisms to take up soluble phosphorous. Additionally, enough dissolved oxygen is provided to nitrify ammonia present in the mixed liquor. A level of dissolved oxygen (DO) of greater than 1 mg/l is believed to be necessary.

In a preferred embodiment, the treatment system is operated through six cycles lasting a total time of between 12 to 15 hours. In Table 1 below, the cycle, time per cycle and condition of each of the basins is set forth.

TABLE 1

| Cycle | Time (hours) | Basin 1 | Basin 2 | Basin 3 |
|---|---|---|---|---|
| 1 | 1-2 | Anaerobic | Aerobic | Aerobic |
| 2 | 3 | Anaerobic | Anoxic | Aerobic |
| 3 | 1-2 | Aerobic | Anaerobic | Aerobic |
| 4 | 3 | Aerobic | Anaerobic | Anoxic |
| 5 | 1-2 | Aerobic | Aerobic | Anaerobic |
| 6 | 3 | Anoxic | Aerobic | Anaerobic |

Prior to the start of cycle 1, basin 1 has had the aerator turned off for approximately three hours and there has been no flow in or out. Nitrates in basin 1 which were produced under prior aerobic conditions have been reduced to nitrogen through biological action. Thus, when the influent stream 6 is switched to basin 1 at the start of cycle 1, conditions in basin 1 are substantially anaerobic. With the addition of BOD containing influent, denitrification is completed relatively quickly. Under anaerobic condition, phosphorous storing microorganisms readily assimilate and store acetate and fermentation products contained in influent 6. At the beginning of cycle 1, basin 1 is at its highest level of solids. Gradually, as influent 6 enters basin 1 and mixed liquor is transferred to basin 2 via interbasin line 18, the solids level in basin 1 decreases.

Prior to the start of cycle 1, the aerator 4 in basin 2 has been on and basin 2 has been receiving mixed liquor from basin 3. Basin 2 has been discharging to clarifier 12 and receiving recycled sludge via sludge line 11. During cycle 1, basin 2 receives mixed liquor from basin 1. Since basin 2 is aerobic, soluble phosphorous present in the mixed liquor from basin 1, will be taken up by the phosphorous storing microorganisms. Ammonia entering basin 2 from basin 1 will be nitrified. Basin 2 discharges to clarifier 12 and receives recycled sludge during cycle 1. The rate at which basin 2 receives mixed liquor from basin 1 is approximately equal to the discharge rate to clarifier 12 less the rate of recycled sludge returned to basin 2.

During the previous cycle, basin 3 received influent 6 under anaerobic conditions. As the phosphorous storing microorganisms assimilate fermentation products in the influent stream, phosphorous is released. At the outset of cycle 1, the phosphorous level in basin 3 is at its greatest level. During cycle 1, aerator 4 is turned on in basin 3 and there is no flow in or out. As basin 3 becomes aerobic, phosphorous is taken up by the phosphorous storing microorganisms and ammonia is nitrified. In basin 3, most of the soluble phosphorous will be taken up and stored by the microorganisms during cycle 1.

Figure 2:
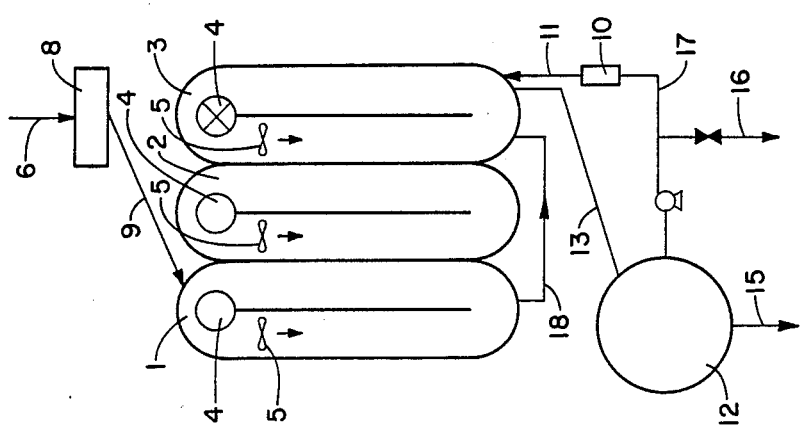
FIG. 2 is a flow diagram of the multiple basin system during cycle 2.
Figure 1:
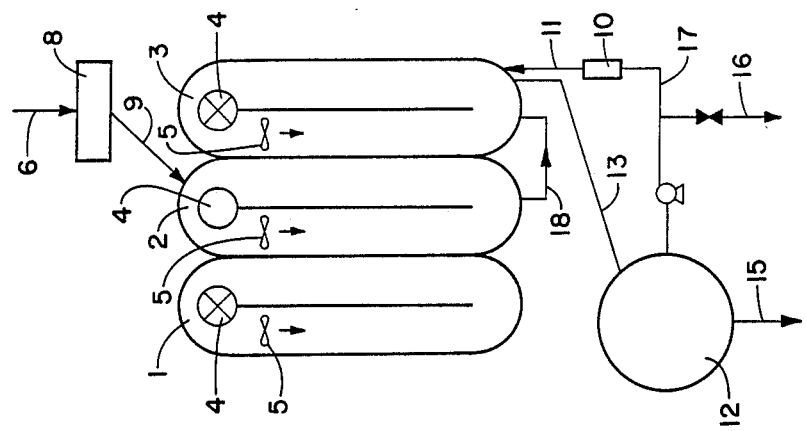
FIG. 1 is a flow diagram of the multiple basin system during cycle 1.
Figure 6:
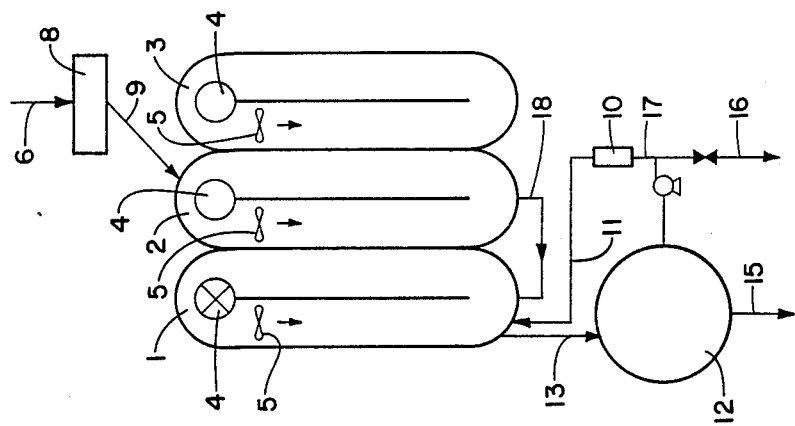
FIG. 6 is a flow diagram of the multiple basin system during cycle 6.

After approximately 1 to 2 hours, the treatment system enters the next cycle, cycle 2 shown in FIG. 2. The state of basin 1 is the same as it was in cycle 1, influent 6 is entering and basin 1 is anaerobic. However, during cycle 2, mixed liquor is transferred from basin 1 to basin 3 instead of to basin 2.

The aerator 4 in basin 2 has been turned off and there is no flow in or out of basin 2. In cycle I, basin 2 was aerated and ammonia in the tank was nitrified. Now, as the dissolved oxygen is depleted, microorganisms in the tank rely upon nitrate oxygen. Since the solids level in basin 2 is at a high point, a significant rate of denitrification can be expected.

Basin 3 was aerobic in the previous cycle and is also maintained aerobic during cycle 2. Most of the phosphorous in basin 3 was taken up in cycle 1. Any soluble phosphorous entering basin 3 from basin 1 is also taken up. The population of the phosphorous storing microorganisms in basin 3 is rising thereby increasing its phosphorous removing capabilities. Ammonia entering basin 3 will be nitrified. During cycle 2, basin 3 discharges to clarifier 12 via line 13 and most of the activated sludge is recycled back to basin 3 via recycled sludge line 11. Cycle 2 takes approximately three hours. As in the previous cycle and in subsequent cycles, the rate at which mixed liquor is transferred to a basin is approximately equal to the rate at which mixed liquor is discharged to the clarifier 12 less the rate of recycled sludge returned to the system.

Figure 3:
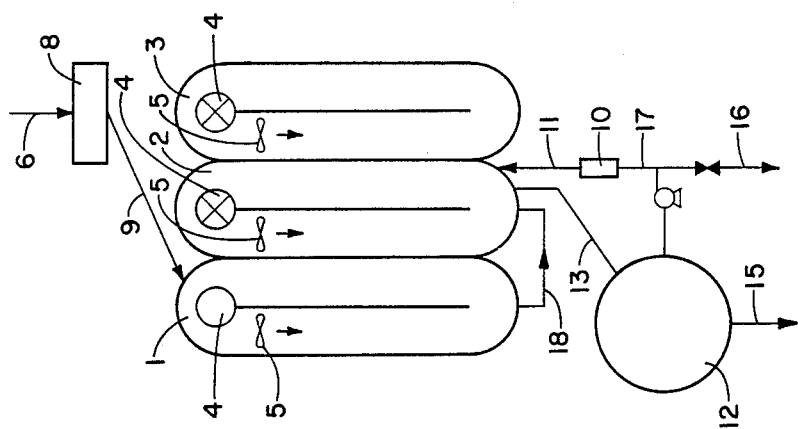
FIG. 3 is a flow diagram of the multiple basin system during cycle 3.

Referring to FIG. 3, cycle 3 of the treatment system is shown. Influent 6 has been switched from basin 1 to basin 2. The aerator 4 in basin 1 has been turned on and phosphorous storing organisms begin to take up soluble phosphorous. Ammonia which entered basin 1 during cycles 1 and 2 is nitrified. There is no flow in or out of basin 1.

In the previous cycle, much of the nitrate in basin 2 was converted to $N_2$ gas through the action of the microorganisms, leaving basin 2 substantially anaerobic. Influent 6 is directed to basin 2 in cycle 3. The solids level in basin 2 is at its highest at the beginning of cycle 3 and gradually decreases as the relatively low solids concentration influent enters basin 2. Interbasin line 18 directs flow from basin 2 to basin 3 during cycle 3. As discussed above, under anaerobic conditions the phosphorous storing microorganisms are able to assimilate and store acetate and fermentation products present in the influent. Assimilation and storage is aided by hydrolysis of stored polyphosphates present in the microorganisms which causes the phosphorous level in basin 2 to rise.

Basin 3 continues to receive mixed liquor via interbasin line 18 during cycle 3. Now, the mixed liquor is from basin 2 rather than basin 1. Aerator 4 is kept on and basin 3 is still discharging to clarifier 12 and receiving recycled sludge.

Figure 4:
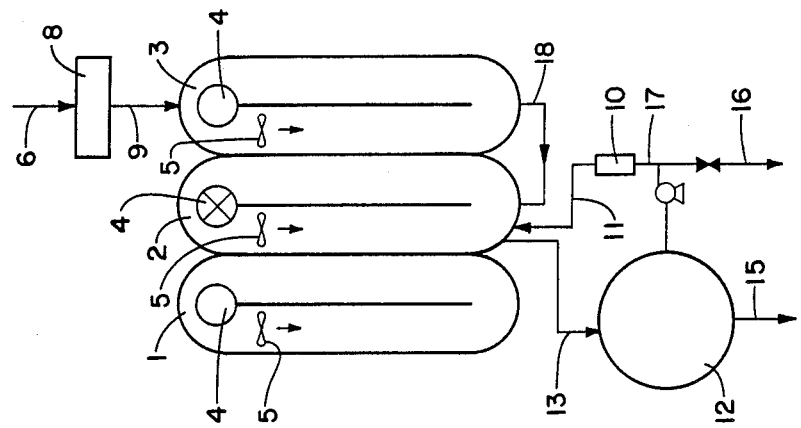
FIG. 4 is a flow diagram of the multiple basin system during cycle 4.

Cycle 3 lasts approximately one to two hours. The basins are next recombined to start cycle 4 as shown in FIG. 4. Basin 1 is aerobic, as it was in cycle 3. Now, basin 1 receives mixed liquor via line 18 from basin 2. During the previous cycle, soluble phosphorous was taken up and ammonia was nitrified in basin 1. Likewise, soluble phosphorous and ammonia entering basin 1 from basin 2 will be taken up and nitrified respectively. Basin 1 is discharging to clarifier 12 and receiving recycled sludge via line 11.

Basin 2 continues to receive influent 6 during cycle 4 under anaerobic conditions. The solids level continues to decrease as basin 2 discharges a mixed liquor having a higher solid concentration than influent 6. Mixed liquor is now transferred to basin 1 via line 18. The phosphorous level in basin 2 continues to rise.

The aerator 4 has been turned off in basin 3. As a result of nitrification of ammonia occurring during cycle 3, basin 3 is anoxic. Solids levels are high. Denitrification resulting in the release of $N_2$ and depletion of dissolved oxygen converts basin 3 to an anaerobic state. Cycle 4 lasts approximately three hours.

Figure 5:
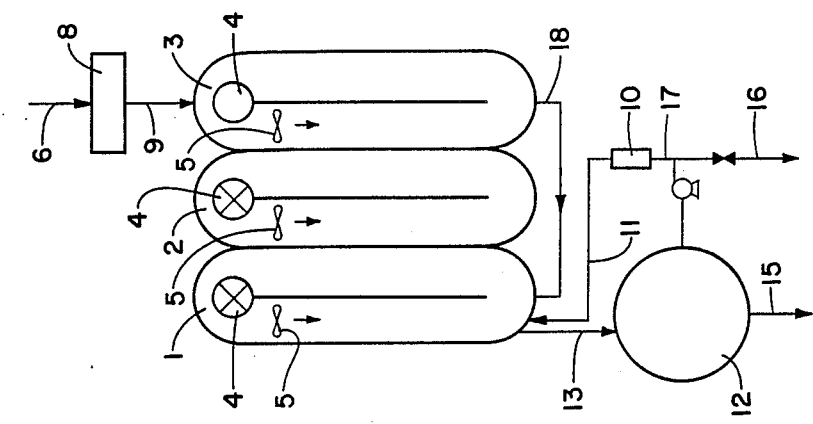
FIG. 5 is a flow diagram of the multiple basin system during cycle 5.

The basin configuration for cycle 5 is shown in FIG. 5. Basin 1 functions substantially the same as it did in the previous cycle. However, instead of receiving mixed liquor from basin 2, basin 1 now receives mixed liquor from basin 3. The solids level in basin 1 continues to rise, increasing the population of phosphorous storing microorganisms available to take up phosphorous.

Basin 2 has no flow in or out. Aerator 4 has been turned on. Most of the soluble phosphorous in basin 2 will be taken up during cycle 5. Ammonia will be converted to nitrates.

Basin 3 is anaerobic and receiving influent 6. Much of the nitrate oxygen having been consumed during the previous cycle. Phosphorous is released by the phosphorous storing microorganisms as they assimilate and store the food available in the influent. The solids level in basin 3 decreases during cycle 5.

After approximately 1 to 2 hours, the treatment system is changed from cycle 5 to cycle 6, the last cycle. There is no flow in or out of basin 1 and aerator 4 has been turned off. Denitrification is taking place as the microorganisms resort to nitrates as an oxygen source. The nitrates and dissolved oxygen in basin 1 are gradually being depleted to prepare basin 1 to receive influent 6 during the next cycle, cycle 1.

During cycle 6, basin 2 receives mixed liquor from basin 3, discharges to clarifier 12 and receives recycled sludge back. Aerator 4 is on. Phosphorous entering basin 2 is taken up and ammonia is nitrified. The solids concentration in basin 2 is increasing.

The phosphorous level in basin 3 is rising as phosphorous storing microorganisms assimilate and store incoming food under anaerobic conditions. Mixed liquor from basin 3 is transferred to basin 2 via line 18. The solids level in basin 3 is decreasing. Cycle 6 lasts approximately 3 hours.

Those with skill in the art will recognize that cycle times and hydraulic retention times may vary between individual applications. Additional factors, such as effluent limits, composition of influent and operating temperature, will affect the parameters of the final design.

The concept of recombinable multiple basins may be extended to systems having more than three basins. For example, a basin could be held at a particular state (anaerobic, anoxic or aerobic) for a longer period of time or additional treatment steps could be employed if four or more basins were available. Also additional steps may be added to the process without deviating from the scope of the invention such as placing an additional aeration tank in line 13 prior to the mixed liquor entering clarifier 12. The proposed aeration tank would enhance nitrification and phosphorous uptake.

There are, of course, many modifications and alternate embodiments of the invention which are intended to be included within the scope of the following claims. For example, a basin could be provided with an internal clarifier. Examples of internal clarifiers suitable for use in conjunction with the process set forth herein are disclosed in Waste Water Clarifier U.S. Pat. No. 4,362,625; Waste Water Clarifier U.S. Pat. No. 4,383,922 and Continuous Waste Water Clarification Process U.S. Pat. No. 4,457,844.

What I claim is:

1. A process for the biological removal of phosphorous from an influent wastewater stream in a treatment facility having at least three basins containing mixed liquor with phosphorous storing microorganisms, the basins discharging to a clarifier for producing an effluent stream and activated sludge, comprising:
   (a) a first step of directing said influent to a first basin at substantially anaerobic conditions, transferring mixed liquor in said first basin to one of said basins at aerobic conditions, discharging mixed liquor to said clarifier from one of said basins other than said first basin, and recycling said sludge from said clarifier to one of said basins other than said first basin;
   (b) a second step of aerating said first basin, directing flow of said influent to a second basin at substantially anaerobic conditions, transferring mixed liquor from said second basin to one of said basins at aerobic condition, discharging mixed liquor to said clarifier from one of said basins other than said second basin, and recycling said sludge from said clarifier to one of said basins other than said second basin; and (c) a third step of aerating said second basin, directing flow of said influent to a third basin at substantially anaerobic conditions, transferring mixed liquor from said third basin to one of said basins at aerobic conditions, discharging mixed liquor to said clarifier from one of said basins other than said third basin, and recycling said sludge from said clarifier to one of said basins other than said third basin.

2. A process according to claim 1 wherein a flow rate of said influent, a flow rate of mixed liquor transferred between said basins and a flow rate of mixed liquor discharged from said basins less a flow rate of said recycled sludge is approximately equal.

3. A process according to claim 2 wherein at each of said steps, said basin at aerobic conditions which is receiving a transfer of said mixed liquor is simultaneously discharging mixed liquor to said clarifier.

4. A process according to claim 2 wherein a each of said steps, said basin which is to have said influent directed thereto has been held without aeration for a sufficient time for the dissolved oxygen to reach a concentration of less than 0.7 mg/l.

5. A process according to claim 2 wherein for each of said steps, said basin which is discharging mixed liquor to said clarifier is simultaneously receiving said recycled sludge from said clarifier.

6. A process according to claim 2 comprising the further step for each of said first, second and third basin of holding said basin without aeration and without flow in or out for at least one hour before said basin is to have said influent directed thereto.

7. A process for the biological removal of phosphorous from an influent wastewater stream in a treatment facility having a plurality of basins containing mixed liquor with phosphorous storing microorganisms, the basins discharging to a clarifier for producing an effluent stream and activated sludge, comprising the steps of:

(a) directing said influent to a first basin at substantially anaerobic conditions, transferring mixed liquor in said first basin to a second basin at aerobic conditions, discharging mixed liquor from said second basin to said clarifier and recycling said sludge from said clarifier to one of said basins other than said first basin;

(b) aerating said first basin, directing said influent to said second basin, transferring mixed liquor in said second basin to a third basin at aerobic conditions, discharging mixed liquor from said third basin to said clarifier and recycling said sludge from said clarifier to one of said basins other than said second basin; and (c) aerating said second basin, directing said influent to said third basin, transferring mixed liquor in said third basin to said first basin, discharging mixed liquor from said first basin to said clarifier and recycling said sludge from said clarifier to one of said basins other than said third basin.

8. A process according to claim 7 wherein a flow rate of said influent, a flow rate of mixed liquor transferred between said basins and a flow rate of mixed liquor discharged to said clarifier less a flow rate of said recycled sludge are approximately equal.

9. A process according to claim 8 wherein ar each of said steps, said sludge is recycled to a basin which is discharging to said clarifier.

10. A process according to claim 7 wherein a hydraulic level of mixed liquor in each of said basins remains approximately constant.

11. A process for the biological removal of phosphorous from an influent wastewater stream containing ammonia in a treatment facility having a plurality of basins containing mixed liquor with phosphorous storing microorganisms, the basins discharging to a clarifier for producing an effluent stream and activated sludge, comprising the steps of:

(a) directing said influent to a first basin at anaerobic conditions sufficient to provide for population selection of said phosphorous storing microorganisms, transferring mixed liquor in said first basin to a second basin at aerobic conditions sufficient to induce said phosphorous removing microorganisms to take up soluble phosphorous present in mixed liquor and to nitrify said ammonia, discharging mixed liquor from said second basin to said clarifier and recycling said sludge from said clarifier to one of said basins other than said first basin and aerating a third basin;

(b) continuing to direct said influent to said first basin, discontinuing aeration of said second basin. transferring mixed liquor from said first basin to a said third basin at aerobic conditions sufficient to induce said phosphorous storing microorganisms to take up soluble phosphorous present in mixed liquor and to nitrify said ammonia, discharging mixed liquor from said third basin to said clarifier and recycling said sludge from said clarifier to one of said basins other than said first basin:

(c) directing said influent to said second basin at anaerobic conditions sufficient to provide for population selection of phosphorous storing microorganisms, transferring mixed liquor in said second basin to said third basin at aerobic conditions sufficient to induce said phosphorous storing microorganisms to take up soluble phosphorous present in mixed liquor and to nitrify said ammonia, discharging mixed liquor from said third basin to said clarifier and recycling said sludge from said clarifier to one of said basins other than said second basin and aerating said first basin;

(d) continuing to direct said influent to said second basin, discontinuing said aeration of said third basin, transferring mixed liquor from said second basin to said first basin at aerobic conditions sufficient to induce said phosphorous storing microorganisms to take up soluble phosphorus present in mixed liquor and to nitrify said ammonia, discharging mixed liquor from said first basin to said clarifier and recycling said sludge from said clarifier to one of said basins other than said second basin;

(e) directing said influent to said third basin at anaerobic conditions sufficient to provide for population selection of said phosphorous storing microorganisms, transferring mixed liquor in said third basin to said first basin at aerobic conditions sufficient to induce said phosphorous storing microorganisms to take up soluble phosphorous present in mixed liquor and to nitrify said ammonia, discharging mixed liquor from said first basin to said clarifier and recycling said sludge from said clarifier to one of said basins, other than said third basin, and aerating said second basin; and (f) continuing to direct said influent to said third basin, discontinuing aeration of said first basin, transferring mixed liquor from said third basin to said second basin at aerobic conditions sufficient to induce said phosphorous storing microorganisms to take up soluble phosphorous present in mixed liquor and to nitrify said ammonia, discharging mixed liquor from said second basin to said clarifier and recycling said sludge from said clarifier to one of said basins other than said third basin.

12. A process according to claim 11 wherein a flow rate of said influent, a flow rate of mixed liquor transferred between said basins and a flow rate of mixed liquor discharged to said clarifier less a flow rate of said recycled sludge are approximately equal.

13. A process according to claim 12 wherein said basins at anaerobic conditions contain less than 0.7 mg/l DO and said basins at aerobic conditions contain greater than 1.0 mg/l DO.

14. A process according to claim 12 wherein for steps (b), (d) and (f) for said second, third and first basins, respectively, aeration is discontinued prior to introduction of influent to said basins for a time sufficient for the dissolved oxygen to reach a concentration of less than 0.7 mg/l.

15. A process according to claim 14 wherein the organic loading rate is 15 lbs. of BOD per day or less per 1000 ft.$^3$ of a combined volume of all of said basins.

16. A process according to claim 11 wherein a hydraulic level of mixed liquor in each of said basins remains approximately constant.

* * * * *